United States Patent [19]

Sidrak

[11] Patent Number: 5,407,356

[45] Date of Patent: * Apr. 18, 1995

[54] PICTORIAL IMAGE TRANSFORMING MANIPULATIVE-WITH MULTIPLE CHANNEL TRACKS

[76] Inventor: Fahim R. Sidrak, 104 Teal Ct., Myrtle Beach, S.C. 29577

[ * ] Notice: The portion of the term of this patent subsequent to Jun. 18, 2011 has been disclaimed.

[21] Appl. No.: 801,603

[22] Filed: Dec. 4, 1991

Related U.S. Application Data

[63] Continuation of Ser. No. 613,403, Nov. 15, 1990, abandoned.

[51] Int. Cl.$^6$ .............................................. G09B 1/02
[52] U.S. Cl. ................................. 434/199; 434/188; 434/211; 434/214
[58] Field of Search ............... 434/215, 80, 72, 199, 434/187, 205, 405, 211, 188, 214; 40/375, 489, 490, 491

[56] References Cited

U.S. PATENT DOCUMENTS

| | | | |
|---|---|---|---|
| 2,068,226 | 1/1937 | Buck | 434/405 |
| 2,239,187 | 4/1941 | Becker | 434/405 |
| 2,319,519 | 5/1943 | Rosaire | 434/405 |
| 2,779,107 | 1/1957 | Brace | 434/405 |
| 3,702,505 | 11/1972 | Hadjigeorghiou | 434/214 |
| 3,939,578 | 2/1976 | Coffey | 434/347 |

Primary Examiner—Jennifer Bahr

[57] ABSTRACT

A visual aid teaching device for translating one or more superimposed picture images in a linear path at different positions with respect to a stationary underlay picture includes as basic components: a pair of edge strip members, each embodying two or more channel tracks; a transparent, or opaque, rectangular flat surface member snugly mounted on the edge strips through their channel tracks to assemble the body device; sets of layers, each including a stationary underlay picture member and one or more superimposed picture image members. Both members may include algebraic graphs or circles divided into sets of sectors. The layer members can be mounted on the other channel tracks. Algebraic problem solving of compound inequalities in one variable can be demonstrated algebraically along with their graphic solution sets simultaneously by means of translating one or more superimposed graphs at different positions with respect to a set of number line graphs. The compound inequalities applied in this present invention include intersection or union of two sets of inequalities, inequalities with absolute values, inequalities involving a (second-degree), (third-degree) or higher terms. Other prescribed sets of pictures and superimposed picture members are used to induce rules for addition of real numbers and to depict operations of common fractions. Sets of picture and superimposed picture image members can be designed to demonstrate other mathematical concepts or geometric theorems.

1 Claim, 8 Drawing Sheets

PICTORIAL IMAGE TRANSFORMING MANIPULATIVE-WITH MULTIPLE CHANNEL TRACKS

This application is a continuation of application Ser. No, 613,403, filed Nov. 15, 1990, now abandoned.

BACKGROUND OF THE INVENTION

1. Field

This invention relates to a body device and sets of superimposed picture members relative to stationary pictures. Each set includes algebraic graphs or circles divded into sectors. The pictorial-image translating device of this present invention visually demonstrates solution sets of algebraic problems in one variable, algebraically and graphically, simultaneously; finds applications to induce rules for addition of real numbers on a number line graph; and projects pictorial explanation for operations of common fractions.

2. State of the Art

Overlay transparencies are commonly used in education on overhead projectors and in direct demonstration without a projector to display a superimposed picture image over a stationary picture. Transforming devices such as those disclosed by patent application No. 07/416,030 apply superimposed features. Among those transforming devices is the translated pictorial device which includes as a basic component: a picture frame member embodying two parallel track strips, slanted in U-shaped grooves for sliding a superimposed picture image in a linear path over a stationary picture. While this device is useful, its production cost may be expensive. Additionally, the device is adaptable for use for one prescribed width of layers, since the distance between rite two channel tracks of the body device is fixed.

In this claimed present invention, the pictorial image translating device comprises a pair of edge strip members embodying channel tracks as separate components and an opaque or transparent flat surface member which may be mounted on the channel tracks to assemble the body device. The embodiment components of this present invention lend themselves to low cost manufacture, easy assembly of components by the users, and adaptability for use for various sizes of prescribed plane surfaces and layers with mathematical graphs. The translated pictorial image devices of this invention find applications for algebraic problem solving of compound inequalities in one variable graphically, helps the learner to induce rules of real numbers on a number line graph, and displays the pictorial concept of operations of common fractions.

SUMMARY OF THE INVENTION

The pictorial image translating manipulative with multiple channel tracks of the claimed present invention is a device adaptable for mounting layers which include mathematical or algebraic pictures and superimposed picture image members to display visually compound inequalities, rules for addition of real numbers, or operations of common fractions graphically. Thus the pictorial image translating device of this invention comprises as basic components: two edge strip members, each embodying two or more channel tracks; a transparent, or opaque, rectangular flat surface member which may be snugly mounted on a pair of edge strip members by inserting the edges of the flat surface member inside the channel tracks lengthwise to assemble the body device. Layers of thermal transparency films for infrared copier or other rigid vinyl materials may include sets of prescribed algebraic or mathematical graphs to represent pictures and superimposed picture members. Both pictures and superimposed picture members can be mounted on the other channel tracks of the edge strips. The superimposed picture images can manually slide at any desirable position with respect to the underlay picture to display visually an algebraic or mathematical concept. Thus, the multiple channel tracks embodying the edge strips can be adapted for use for various prescribed sizes of rectangular plane surface members along with layers.

The pictorial image translating device of this invention finds applications as an instructional aid to demonstrate visually the intersection or union set of inequalities in one variable graphically by means of translating superimposed line graphs over one or more number line graphs. The picture member includes a stationary underlay number line graph, marked to display points paired with coordinates, extending a prescribed unit length in both positive and negative directions from its origin. The number line graph is linear calibrated in conventional fashion from zero at its origin to one in the positve direction and minus one in the negative direction. Two superimposed picture image members, each including a graph of two parallel lines, intercept hatched segments and an empty circle on one end. In another optional design graph, the other end of each of the two parallel lines may include an arrowhead so that each graph may resemble a ray and an empty circle at its endpoint. Of course the two parallel lines may intercept a shade of transparent solid color and that is only another option. Thus, each graph superimposes the number line graph and can be translated at any desirable position to represent algebraic inequalities for each set $S_1$ and $S_2$. The set $S_1 = \{x:x<a\}$ is the set of all x such that x is less than a; a represents a coordinate on the number line graph designated by the empty circle. Another superimposed graph member may demonstrate set $S_2$, $S_2 = \{x:x>b\}$; b represents a coordinate on the number line graph desidnated by the empty circle for set $S_2$. The solution set of $S_1 \cap S_2$ is thus the intersection of the solution sets $\{x:x<a\} \cap \{x:x>b\}$ and that can be designated visually in the area marked by cross lines. One superimposed picture member or both of them can be removed then remounted after altering their sides or flipping over their faces to display other types of problem solving for the intersection or union sets. Any of the empty circles can be filled in with a marking pen if $\{x:x \leq a\}$ or $\{x:x \geq b\}$. Thus many problems for the intersection or union sets of compound sentences of inequalities in one variable can be visually demonstrated along with their solutions.

In the preferred form of demonstrating the union or intersection of sets of inequalities in one variable of this invention, a stationary picture member may include three parallel number line graphs with the same scale unit, the calibrated marks of their corresponding coordinates are lined up in vertical fashion. These marked points are paired with numbers in both positive and negative directions from the origin to represent the coordinates as previously described; each of the two overlays includes a pair of prescribed hatched lines. Two hatched lines in one overlay superimpose the top and the bottom number line graphs; the other two hatched lines superimpose the middle and the bottom number lines. Thus, the superimposed picture members may be translated at different positions to demonstrate the graphs of two sets of inequalities $S_1$ and $S_2$ designated by the top two hatched lines; the overlapping hatched lines superimpose the bottom number line graph to display the intersection or the union set. Again, one of the superimposed graphs can be remounted to demonstrate other types of problem solving as previously described.

The union and the intersection of two sets can be applied in solving inequalities involving absolute values. For example: $|x|<a=\{x:x<a\}\cap\{x:x>-a\}$, $a>0$ and $|x|>a=\{x:x>a\}\cup\{x:x<-a\}$, $a>0$. Inequalities involving algebraic expressions need to be solved algebraically first by isolating the variables before demonstrating their solution sets graphically.

The translated pictorial manipulative of the present invention finds applications of solution sets of inequalities involving a (second-degree) and a (third-degree) term or higher, algebraically and graphically by means of using prescribed graphs on layers. The layers comprise: a stationary picture member which includes a set of four parallel line graphs with their corresponding coordinate points lined up in vertical fashion as previously described; two or more superimposed picture image members, each including an empty circle in the midsection and extending positive and negative marked signs with respect to the circle; the circle and the indicated signs bounded by the two parallel lines, a line segment normal the parallel lines at the center of the circle may include another empty circle at its bottom endpoint. The top and the bottom circles on each overlay graph superimpose a distinct number line, and the bottom number line graphs respectively. The two superimposd graphs separate the number line graphs into three regions by the vertical segments. The product of the designated signs above the number lines in each designated region may determine the solution set on the bottom number line graph. The superimposed graphs may be translated at any desirable position to apply for problem solving. For example, to find the solution set of the inequality $(x-a)(x-b)>0$, $a<b$, the top two circles can be translated to superimpose the coordinates a and b on the number line graphs and the solution set $\{x:x<a\}\cup\{x:>b\}$, $a<b$, can be graphed with a marking pen on the top superimposed member across the bottom number line graph. Thus, the solution set may be represented graphically by drawing two opposite rays with open circles at their endpoints on the left and the right directions of a and b respectively. Another example, $(x-a)(x-b)<0$, $a<b$, its solution set: $\{x:x>a\}\cap\{x:x<b\}$ and the graph is a segment drawn on the bottom number line graph between a and b.

The solution set of inequality involving a (third-degree) term can be demonstrated in a similar manner by mounting three superimposed picture members, each including one graph. Of course, the process may proceed to demonstrate the solution set of inequality involving a higher degree term by means of increasing the number line graph's count and the superimposed graph's count.

In another alternative design to depict solving inequalities of a (second-degree) term or higher, the picture member includes only the bottom number line graph, the two parallel lines with their intercepted positive and negative signs on each superimposed graph may be replaced by two opposite rays with two distinct color prints, red and blue, to represent positive and negative signs respectively. The opposite rays intercept an empty circle at their endpoints, a line segment normal the two rays at the center of the circle may include another empty circle at its bottom endpoint. The bottom circle is prescribed to superimpose the number line graph. Again, the process of demonstrating the solution set of inequalities may proceed as previously described.

The pictorial translating device of this present invention finds application to demonstrate addition of real numbers graphically. A stationary underlay picture member may include a number line graph marked with its origin at the center and extended a prescribed unit length in both positive and negative directions from the origin as previously described. A superimposed picture image includes a number line graph with the same scale. The coordinates on the superimposed number line graph may be printed above the line graph so that the translated coordinates may not overlap with those underlay coordinates. In demonstrating addition of two numbers 4 and 3 graphically as an ilustrative example, the marks which correspond to the origin coordinates on the number line graphs may line up in the initial setting. The calibrated mark which corresponds to 0 coordinate on the superimposed number line graph may be translated 4 units on the underlay number line graph. Now the translated origin coordinate represents the new initial reading, with 3 units added; the result of 7 indicated below the coordinate 3 can be read. In another example, to add $-3$ and and 2, the calibrated mark that corresponds to 0 coordinate on the superimposed number line graph may be translated $-3$ units on the underlay number line; and, with 2 units added, the result $-1$ indicated below the coordinate 2 can be read. Thus, many problem solving examples can be displayed to induce rules for addition of real numbers. Addition of natural numbers, i.e. the positive integers, can be demonstrated graphically; the coordinates of the number line graphs may represent whole numbers on another set of picture and superimposed picture members. Furthermore, the coordinates on other sets of number line graphs, on both picture and superimposed picture members, may include origins, positive and negative decimal fractions, as applications for addition of decimal fractions graphically.

The pictorial translated device of this present invention finds application to exemplify the pictorial operations of common fractions such as equivalent fractions and addition of fractions. A stationary underlay picture member may include one or more circles, each divided into a set of sectors marked by hatched lines. The sectors can be marked with distinctive transparent solid colors; a superimposed picture image member may include one or more circles with radii congruent with those on the underlay circles. The superimposed circle(s) in each circle divided into congruent sectors and the number of sectors in each circle are distinct. In an illustrative example, if the picture member includes a circle with a sector which represents $\frac{2}{3}$ of the circle and a superimposed member which includes two circles have the same radii, one circle includes 6/9 of the circle and the other 8/12. Using the translated superimposed feature, the fractions $\frac{2}{3}$, 6/9, and 8/12 can be demonstrated as equivalent. Other sets of prescribed pictures and superimposed picture members may provide many applications of equivalent fractions. In demonstrating addition of two fractions, a picture member may include a circle with sectors having common radii, each sector covered with hatched lines or distinct transparent solid colors to represent the two added fractions; include a circle with the same radius and divided into congruent sectors. The number of the superimposed sectors is prescribed to equate the least common denominatorof the numbers representing the two added fractions on the picture member. The sum of the two added fractions can be pictured by applying the superimposed feature. For example, $\frac{1}{2}+\frac{1}{3}$ can be visually demonstrated to equate $3/6+2/6=5/6$. This process may be applied to demonstrate two problem solutions in addition of fractions. The picture member may include tow congruent circles, each including a set of shaded sectors or distinct color sector so that the set of sectors in each circle represents addition of two fractions; a superimposed picture member may include the same radius divided into congruent sectors such that the number of secotrs equates the least common denominator of the added fractions represented by the sectors on the picture member. Thus the sum of the added fractions in each set of sectors can be pictured by means of using the superimposed features. For example, the sectors in one circle may represent $2/9+1/6+\frac{1}{3}$ and in the other circle $1/18+2/9+\frac{1}{3}$. The number of sectors on the superimposed members equals the least common denominator of 18, 9, 6, and 3. Again, many problem solving examples to exemplify operations of common fractions can be pictured by applying miscellaneous sets of picture and superimposed picture members with prescribed sectors.

BRIEF DESCRIPTION OF THE DRAWINGS

In the drawings, the mode for carrying out the invention:

FIG. 1, a front view, in elevation, and

FIG. 3, a front view, in elevation, and

FIG. 5, a front view, in elevation, and

FIG. 7, a front view, in elevation, and

FIG. 8, a side view, in elevation, of an alternative design of the pictorial image translating manipulative with three channel tracks.

FIG. 9, a front view, in elevation, and

FIG. 18 and FIG. 19 illustrate the best mode of depicting the solution set of the intersection and the union sets of inequalities respectively.

DETAILED DESCRIPTION OF THE INVENTION AND THE ILLUSTRATED EMBODIMENTS

The description of the manipulative devices of this invention presented herein provides the functional features of the devices as they relate to algebraic inequalities in conjunction with algebra textbook and general mathematics topics. This article provides the basic concept used in depicting algebraic graphs for solution sets of inequalities in one variable, help students to induce rules for operations of real numbers, and illustrates operations of common fractions.

The scope of the present invention is not confined in the illustrated pictorial image translating manipulative devices as designated in the sets of drawings herein because the invention is basically designed to create curriculum courses in mathematical graphics, geometric theorems, and mathematical concepts using the pictorial image-translating body device and sets of prescribed picture and superimposed picture image members as previously described in the summary of the invention.

Figure 1:
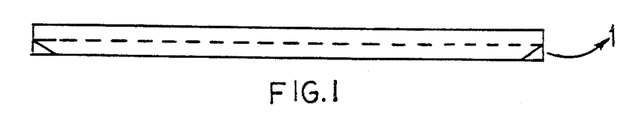
Figure 2:
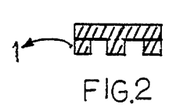
FIG. 2, a side view, in elevation of the strip edge with two channel tracks.

FIGS. 1 and 2 illustrate an edge strip, embodying two track channels truncated at the ends on both front and back surfaces to allow convenient access for mounting the picture, the superimposed picture members, and the plane surface.

Figure 3:
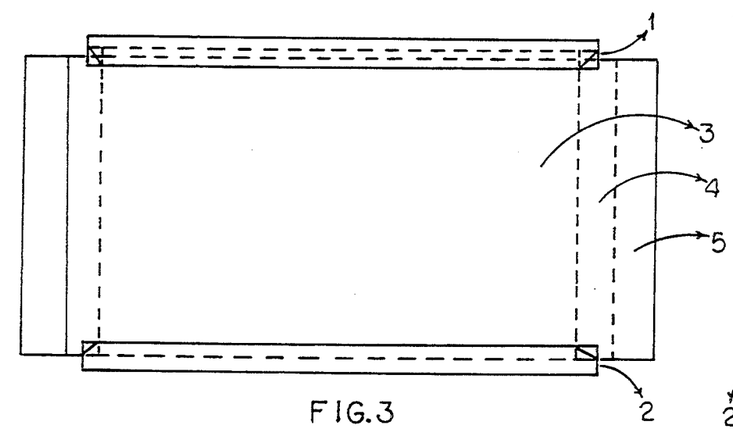
Figure 4:
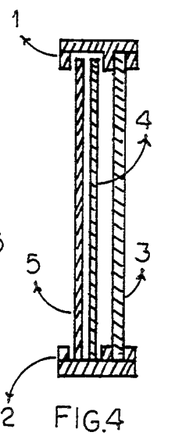
FIG. 4, a side view, in elevation, of the pictorial image translating manipulative with two channel tracks.
Figure 5:
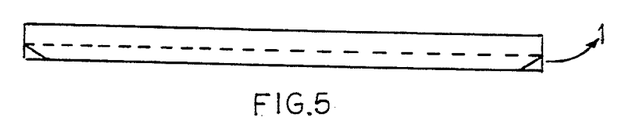
Figure 6:
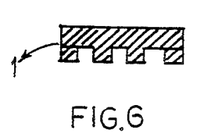
FIG. 6, a side view, in elevation, of an alternative design of the edge strip with three channel tracks.
Figures 7, 8:
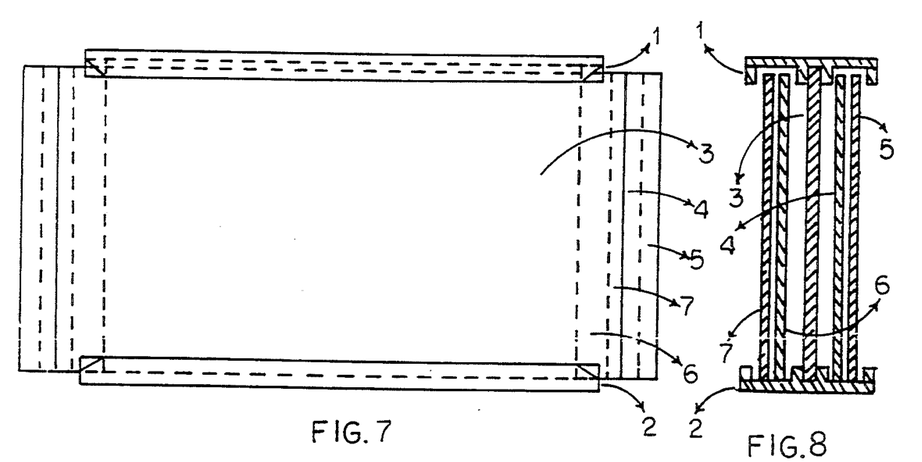

The pictorial image-translating device with multiple channel tracks illustrated in FIGS. 3 and 4 comprises: two edge strips 1 and 2, each embodying two channel tracks, and a plane surface 3, transparent or opaque, mounted on the rear channel tracks to assemble the body device. A stationary picture member 4 and a superimposed picture member 5 may include algebraic graph or geometric picture and can be mounted together on the front channel tracks of the body device. The superimposed picture member 5 may be translated manually in a linear path with respect to the stationary picture member 4. Additional superimposed picture members may be mounted on top of member 5. FIGS. 5 and 6 illustrate an edge strip embodying three channel tracks. FIG. 7 and FIG. 8 illustrate an alternative pictorial image-translating device comprising: two edge strips 1 and 2 with three channel tracks; a transparent plane surface 3 mounted on the middle channel tracks to assemble the body device; a stationary picture member 4; superimposed picture image members 5, 6, and 7, with 6 and 7 mounted on top of planes 3, and 5 behind picture member 4. Of course, members 4, 5, 6, and 7 can be altered such that member 4 is mounted on the rear channel track and members 5, 6, and 7 on the front one.

Figure 9:
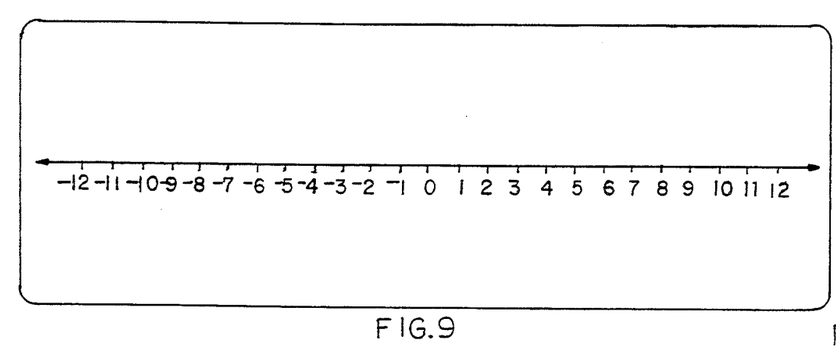
Figure 10:
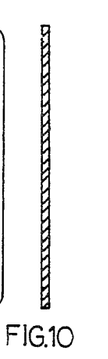
FIG. 10, a side view, in elevation, of the picture member which includes a number line graph.
Figure 11:
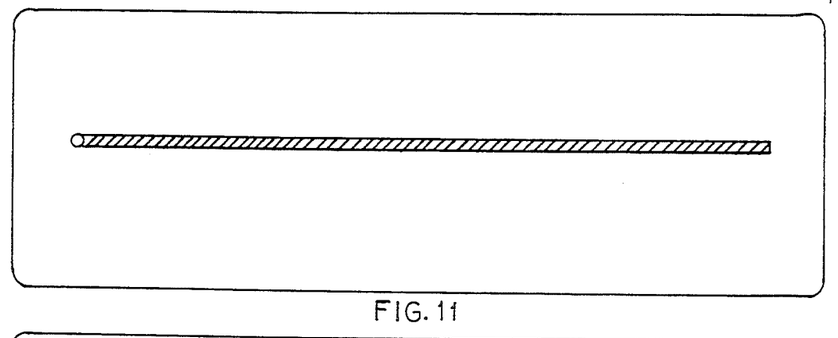
FIGS. 11 and 12, a front view, in elevation, of the superimposed picture image members.
Figure 12:
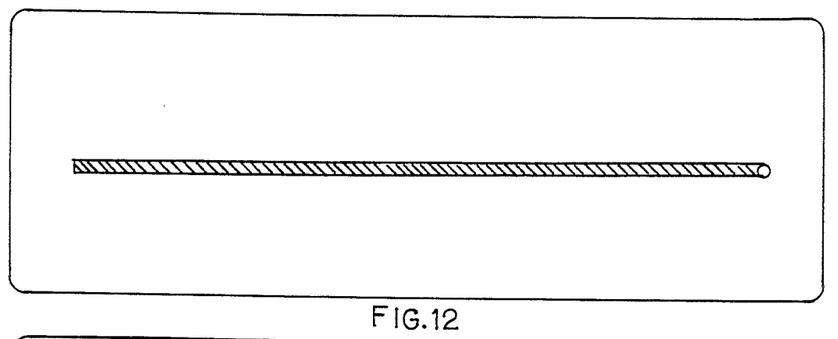
Figure 13:
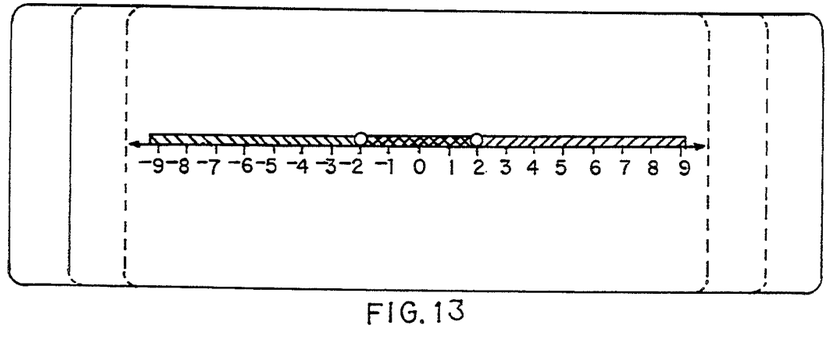
FIG. 13, a front view, in elevation, with the superimposed picture image members of FIGS. 11 and 12, and the stationary picture member of FIG. 9 to demonstrate the solution sets of the intersection of two inequalities.
Figure 14:
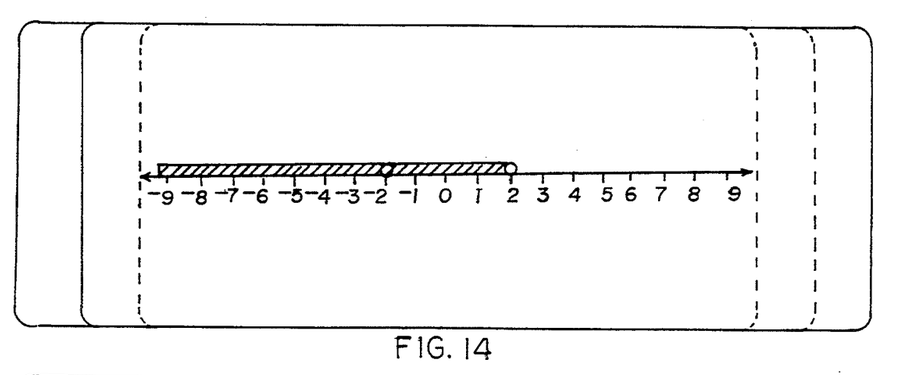
FIG. 14, a front view, in elevation, comprises: two superimposed picture image members, represents FIG. 12 in a flipped over position, FIG. 11, and the stationary picture member of FIG. 9 to demonstrate the union sets of the inequalities.

FIG. 9 illustrates a front view, in elevation, of a picture member which includes a number line graph drawn in the middle, linearly calibrated from zero, at its origin in the center and extending a prescribed unit length in both positive and negative directions from the origin to designate the coordinates as previuosly described in the summary of the invention. FIGS. 11 and 12 illustrate superimposed picture members that are mounted on FIG. 9. FIG. 13 comprises FIGS. 9, 11, and 12. FIG. 11 can be translated in a linear path at different positions with respect to the number line graph of FIG. 9 to demonstrate graphically the solution set of all real numbers x such that x is greater than a; a represents a coordinate on the number line graph designated by the empty circle; i.e. $S_1=\{x:x>a\}$. Similarly, the superimposed picture member of FIG. 12 can be translated at a different position with respect to FIG. 9 to represent $S_2=\{x:x<b\}$; b represents a coordinate on the number line graph with reference to FIG. 12. Members 11 and 12 can be translated either separatedly or simultaneously on the number line graph at different positions to demonstrate the solution set of the intersection of $S_1$ and $S_2$, $S_1 \cap S_2$. FIG. 13 demonstrates graphically the intersection set S, $S=\{x:x>-2\}\cap\{x:x>2\}$; x is an clement in all real numbers R. S can be expressed as $S=\{x:-2<x<2\}$ or $S=\{x:2>x>-2\}$. The intersection set S is represented by the graph in the region designated by marked cross segments. FIG. 14 illustrates the superimposed picture member of FIG. 12 which is mounted on a flipped-over position and placed on top of FIGS. 11 and 12. The process of translating the superimposed graphs may proceed to display the solution set of the union $S=S_1 \cup S_2=\{x:x<2\}$.

Inequalities involving absolute values are extensions to the intersection and the union sets of real numbers and, consequently, can be represented graphically as previously described. For example, $|x|<b$ are those members that satisfy $-b<x<b$; $|x|>b$ for $x<-b$ or $x>b$; $|x|=b$ for $x=-b$ or $x=b$; b is any positive number. In problem solving of inequalities in one variable, algebraic expressions are involved; therefore, the inequalities need to be solved algebraically by isolating the variables before demonstrating their solution set graphically.

Figure 15:
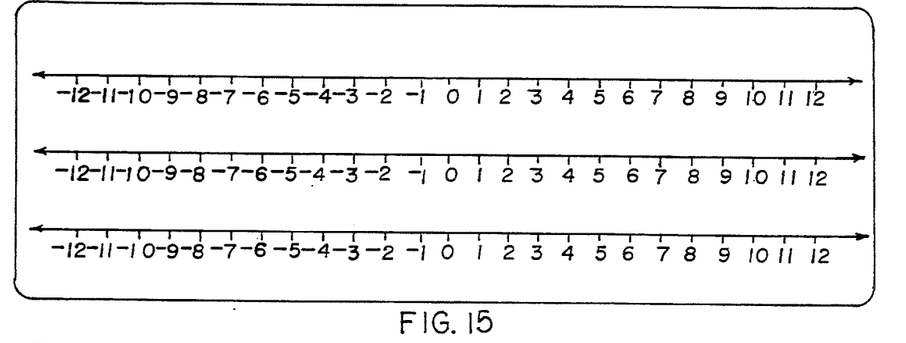
FIG. 15, a front view, in elevation, of an alternative form of the picture member which includes three parallel number line graphs.
Figure 16:
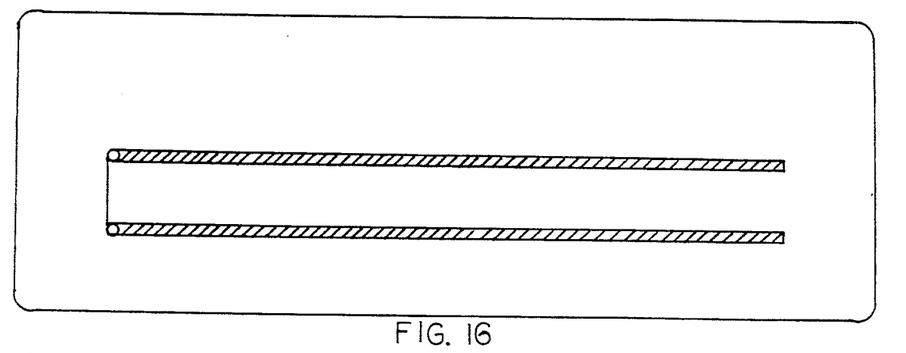
FIGS. 16 and 17, a front view, in elevation, of alternative superimposed picture image members.
Figure 17:
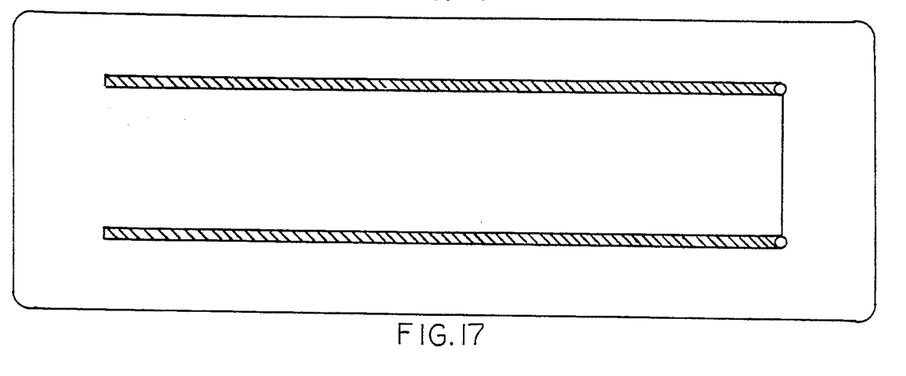
Figure 18:
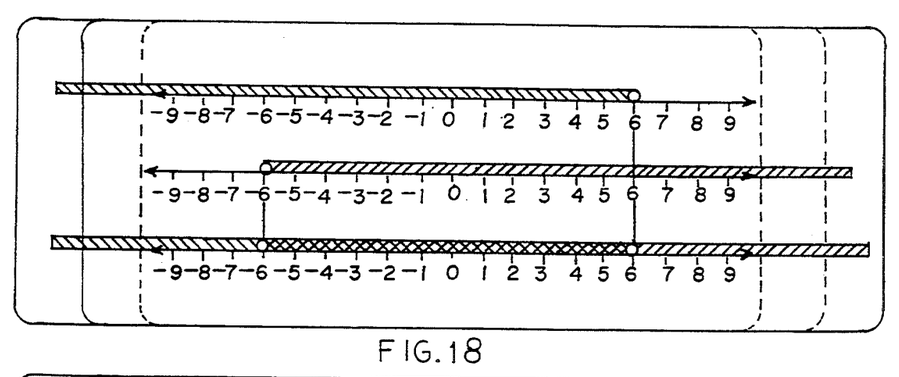
FIG. 18, a front view, in elevation, with the superimposed picture image members of FIGS. 16 and 17, mounted on the stationary picture member of FIG. 15 to demonstrate the intersection sets of the inequalities.
Figure 19:
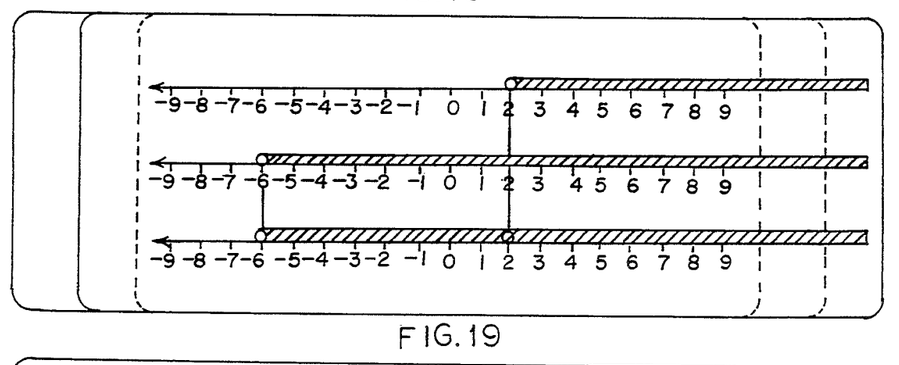
FIG. 19, a front view, in elevation, comprises two superimposed picture image members, FIG. 17 in a flipped over position, FIG. 16, and the picture member of FIG. 15, to demonstrate the solution set of the union of the inequalities.

A preferred embodiment for demonstrating the intersection and the union sets graphically of this invention, the picture member of FIG. 15 includes three parallel number line graphs with their corresponding coordinates lined up in vertical fashion such the lines divide the distance equally between the edges of the picture member. FIGS. 16 and 17 illustrate superimposed picture image members. The top hatching lines of FIGS. 16 and 17 are prescribed to superimpose the middle and the top number line graphs of FIG. 15; the bottom two hatching lines superimpose the bottom number line graph; and, therefore, they overlap. Now, as FIG. 16 is translated, the two hatching lines superimpose the middle and the bottom number line graphs simultaneously, while the two hatching lines of FIG. 17 superimpose the top and the bottom number line graphs. Thus the bottom two hatching line graphs demonstrate the intersection set. FIG. 18 comprises FIG. 15 as a picture member superimposed by members of FIGS. 16 and 17. Members 16 and 17 may be translated at different positions on member 15 to demonstrate two sets of inequalities designated on the top two number line graphs along with their intersection set on the bottom simultaneously. For example, the top two number line graphs of FIG. 18 designate the sets $S_1=\{x:x<6\}$ and $S_2=\{x:x>-6\}$, at the same time, their intersection set $S=S_1 \cap S_2=\{x:-6<x<6\}$ or $\{x:6>x>-6\}$ is pictured on the section of the bottom number line graph indicated by cross hatching marks. FIG. 19, illustrates the member of FIG. 17 mounted in a flipped-over position and placed on top of FIGS. 16 and 15. The union set S of FIG. 19: $\{x:x>2\}\cup\{x:x>-6\}=\{x:x>-6\}$ is demonstrated by hatching lines on the bottom number line graph.

Figure 20:
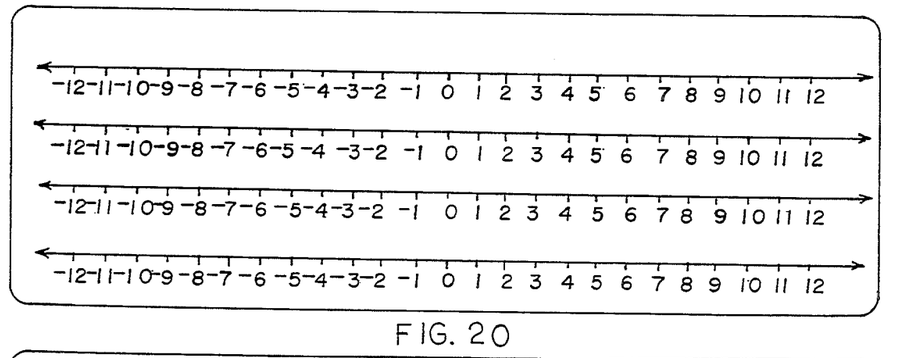
FIG. 20, a front view, in elevation, of the picture member with four parallel number line graphs.
Figure 21:
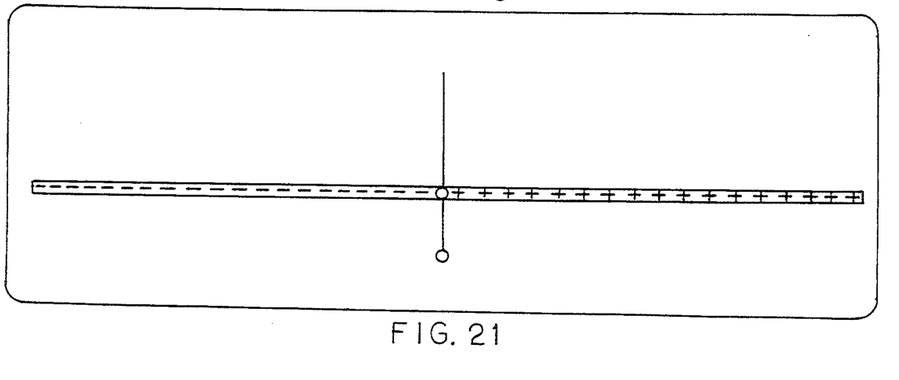
FIGS. 21 and 22, a front view, in elevation, of the superimposed picture members.
Figure 22:
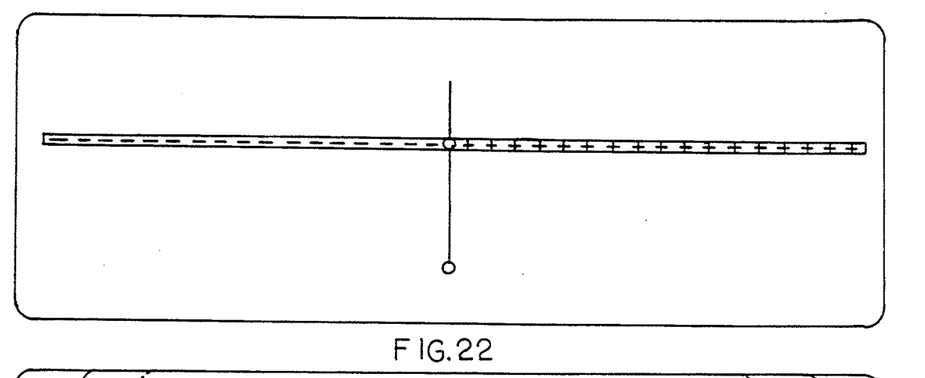
Figure 23:
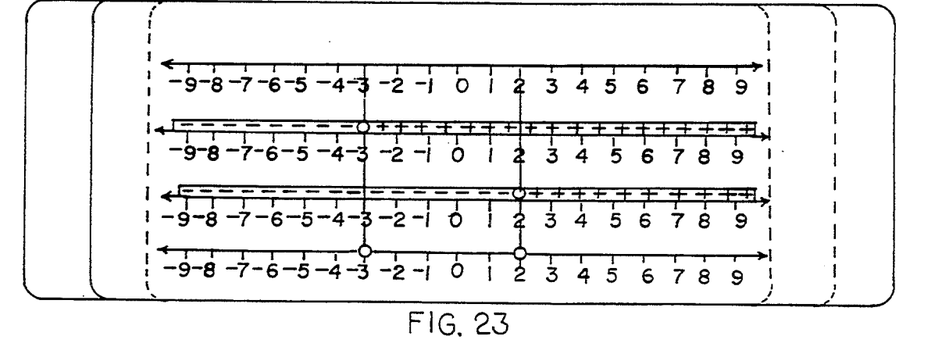
FIG. 23, a front view, in elevation, with the superimposed picture image members of FIGS. 21 and 22, mounted on the stationary picture member of FIG. 20 to demonstrate the solution set of a quadratic inequality (one involving a second-degree term.)
Figure 24:
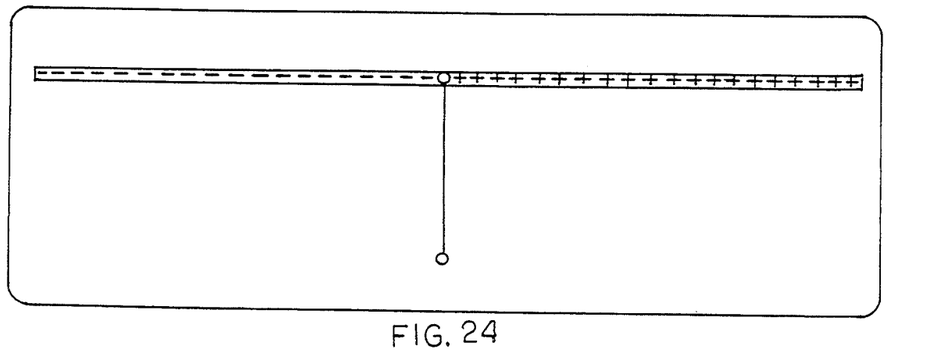
FIG. 24, a front view, in elevation, of an additional superimposed picture member for the solution set of inequality (involving a third-degree term.)
Figure 25:
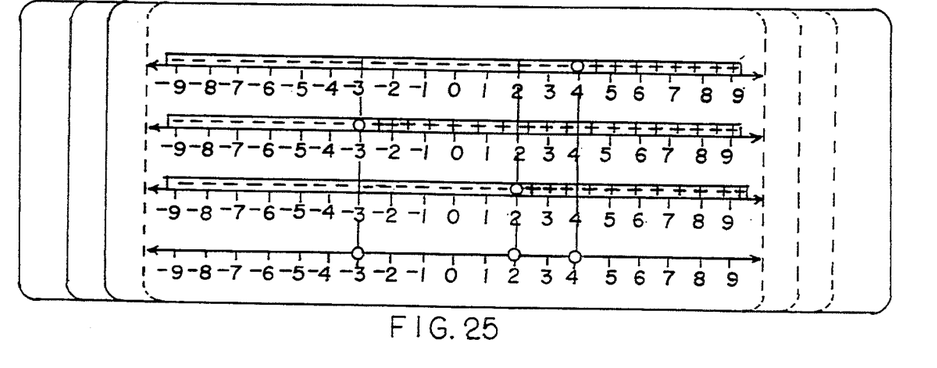
FIG. 25, a front view, in elevation, with the superimposed picture image members of FIGS. 21, 22, and 24, mounted on the stationary picture member of FIG. 20 for the solution set of inequalities (involving a third-degree term.)

In this present invention, the solution sets of inequalities in one variable of the (second-degree) and the (third-degree) can be demonstrated graphically. FIG. 20, illustrates the picture member which includes four parallel number line graphs with their corresponding coordinates lined up in a vertical fashion. The number line graphs divide the distance equally between the edges of the member of FIG. 20. The positive and negative signs designated on each of FIGS. 24, 22, and 21 are prescribed to superimpose the three top number line graphs; the circles at the end of the vertical segments superimpose the bottom line graph. FIG. 23 comprises FIGS. 20, 21, and 22; the two vertical lines that include two pairs of circles divide the number line graphs into three regions. The product of the signs designated on each region provides the solution set on the bottom number line graph. For example, to solve $(x-a)(x-b)>0$, $a<b$, a and b represent the coordinates on the middle number line graphs designated by the empty circles. Thus, the solution set: $\{x:x<a\}\cup\{x:x>b\}$ can be graphed on the bottom number line by drawing two opposite rays using a marking pen, each ray including an empty circle at its endpoint, with one ray on the right direction of b and the other on the left of a. In another example, the solution set of $(x-a)(x-b)<0$, $a<b$ is $\{x:a<x<b\}$. The solution set can be graphed by drawing a segment that joins the two circles on the coordinates a and b on the bottom number line graph, since the product of the two binomials is negative. FIG. 25 comprises FIGS. 20, 24, 22, and 21. Now the three vertical lines divide the number line graphs into three regions. Again, the product of the signs designated on each region provides the solution set on the bottom number line graph. For example, to solve $(x-a)(x-b)(x-c)>0$, a, b, and c represent the coordinates on the number line graphs designated by the circles, $a<b<c$. The solution set: $\{x:a<x<b\}\cup\{x:b<x<c\}$ can be graphed on the bottom number line graph by drawing a ray from circle a on the right direction, and a segment that joins the two circles at the coordinates b and c. The empty circles in any of the three graphs can be filled in by a marking pen if the product of the binomials is less than or equal to 0.

In the preferred embodiment of solving inequalities of the (second-degree) or the (third-degree) terms of the pictorial image device of this invention, the picture member includes the bottom number line graph only. The positive and negative signs with their bounded parallel lines on the superimposed members may be replaced by two opposite rays. The endpoints of the two rays intercept a circle, the positive ray can be marked with red color and the negative with blue color. The process of solving the inequalities may then proceed as previously illustrated.

Figure 26:
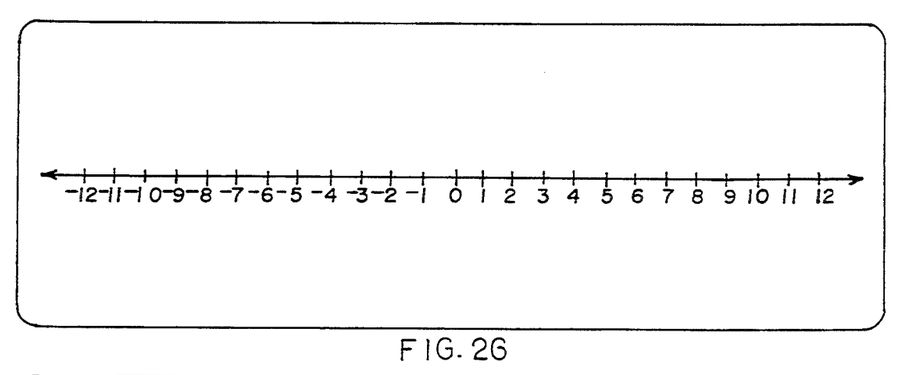
FIG. 26, a front view, in elevation, of the picture member.
Figure 27:
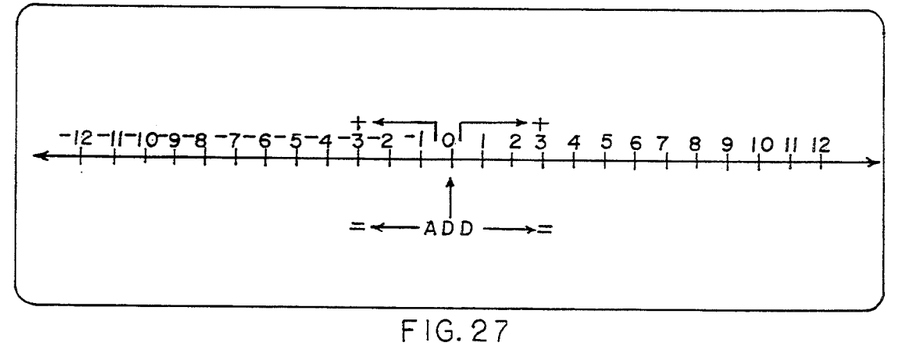
FIG. 27, a front view, in elevation, of the superimposed picture image member.
Figure 28:
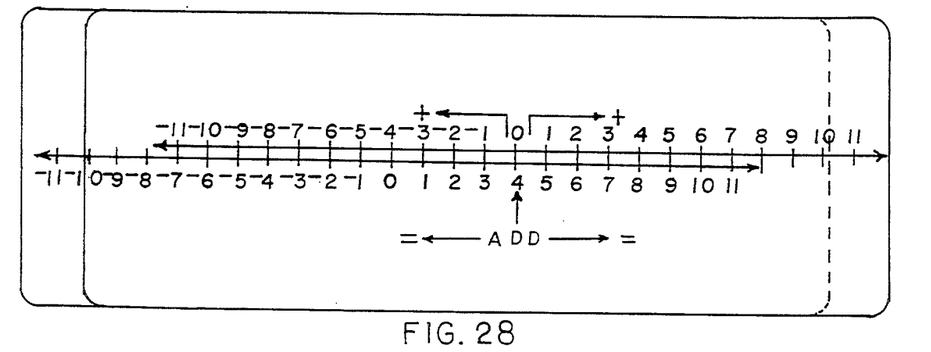
FIG. 28, a front view, in elevation, with the superimposed picture image member of FIG. 27 mounted on the picture member of FIG. 26 for the rules of addition of real numbers.

The pictorial image-translating device of this invention finds applications to induce rules of addition of real numbers in an algebraic topic. The techniques being used are to translate a superimposed picture member which includes a number line graph in a linear path at different positions over a picture member including a number line graph having the same unit number scale. FIG. 26 is a stationary picture member; FIG. 27, a superimposed picture member; and FIG. 28 comprises FIGS. 26 and 27. For example, in adding two integers such as 4 and 5, the calibrated marks of the origin coordinates on the two number line graphs in FIG. 28 need to be lined up in the initial stage. The calibrated mark that corresponds to the origin on the superimposed number line graph may be translated 4 units. Now, the origin on the superimposed number line graph represents a translated origin, and with 5 added units from the translated origin, the result 9 below 5 units can be read. Thus, the process may proceed in adding any two integers included on the coordinates such as $4+(-5)=-1$ and $4+(-4))=0$. In adding more than two integers, successive additional operations may be applied. For example, to add $4+(-7)+(-2)$, the sum of $4+(-7)=(-3)$ can be demonstrated as previously illustrated. Now, the corresponding mark on the origin can be translated again above the $-3$ coordinate; and, with the $-2$ coordinate adding units from the translated origin the result $-5$ below $-2$ units can be read. The objective of using this device in adding numbers is to demonstrate an illustrative mathematical concept to induce rules for addition of integers graphically as a teaching aid and not as a calculating device. This technique can be applied in adding decimal fractions where the coordinates on the number line graphs include the origin extending positive and negative decimal fractions instead of integers. To apply addition of positive integers for a lower mathematical level, another set of two number lines may include origin coordinates extending positive integers only.

Figure 29:
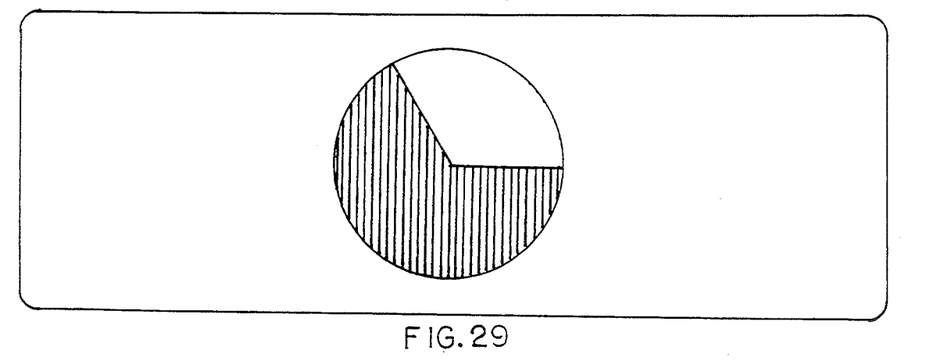
FIG. 29, a front view, in elevation, of the picture member.
Figure 30:
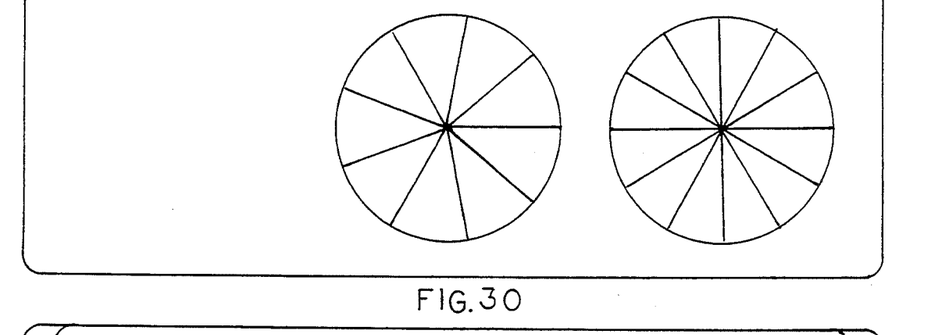
FIG. 30, a front view, in elevation, of the superimposed picture image member.
Figure 31:
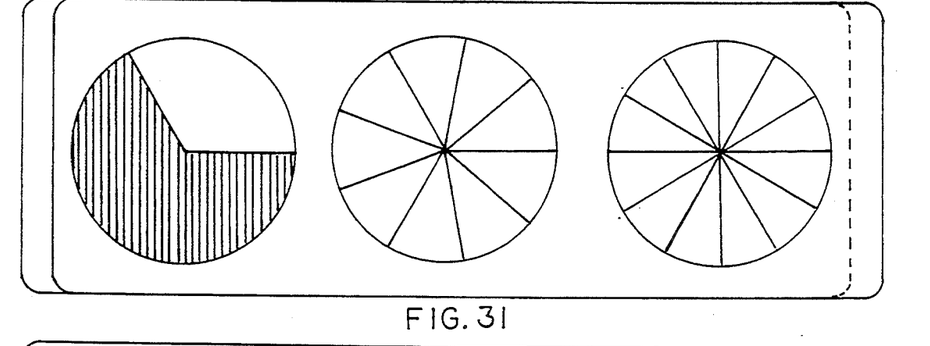
FIG. 31, a front view, in elevation, with the superimposed picture image member of FIG. 30 mounted on the picture member of FIG. 29 to demonstrate equivalent fractions.
Figures 32, 33:
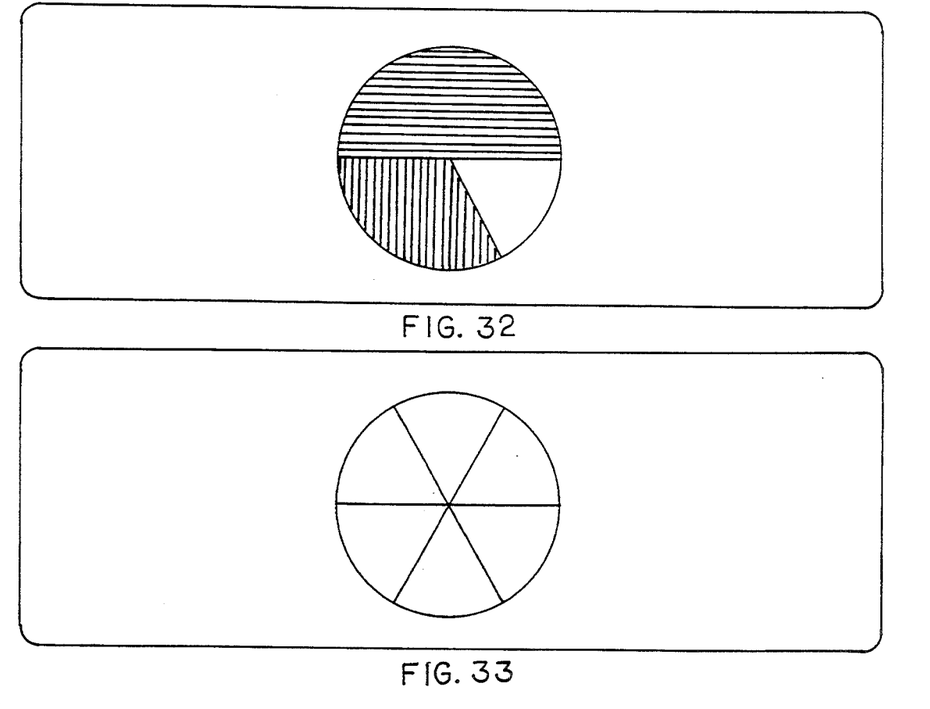
FIG. 32, a front view, in elevation, of the picture member.
FIG. 33, a front view, in elevation, of the superimposed picture image member.
Figure 34:
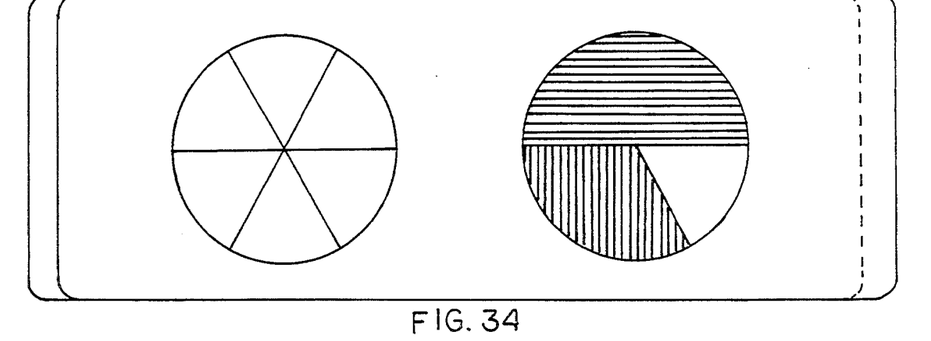
FIG. 34, a front view, in elevation, with the superimposed picture image member of FIG. 33 mounted on the picture member of FIG. 32 for addition of two common fractions.
Figure 35:
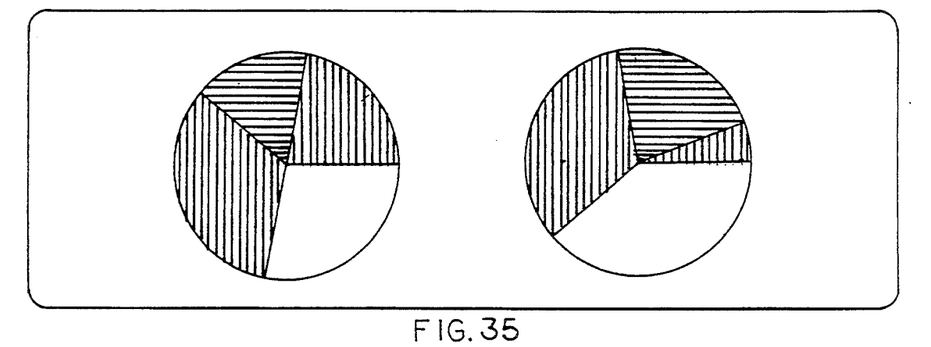
FIG. 35, a front view, in elevation, of the picture member.
Figure 36:
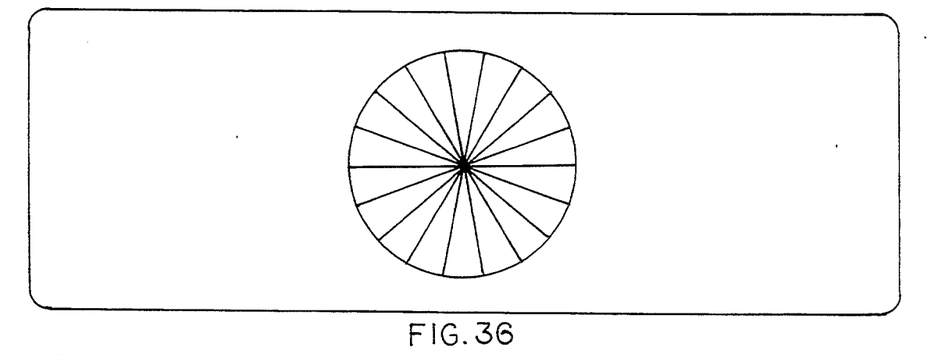
FIG. 36, a front view, in elevation, of the superimposed picture image member.
Figure 37:
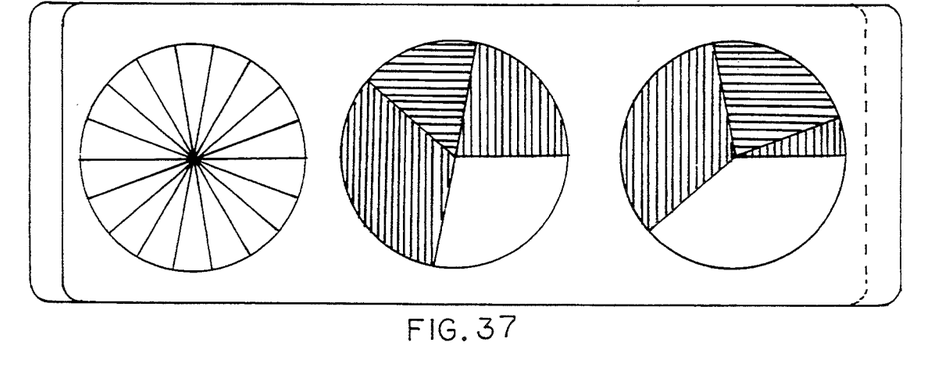
FIG. 37, a front view, in elevation, with the superimposed picture image member of FIG. 36 mounted on the picture member of FIG. 35 to demonstrate addition of two sets of common fractions, each set including three added fractions.

The pictorial image-translating device of this present invention finds useful applications to exemplify pictorial features for operations of common fractions, a topic particularly important in teaching a lower mathematical course level. FIG. 29, a picture member, includes a sector marked with hatching segments and form ⅔ of the area of the circle; FIG. 30, a superimposed picture member, includes two circles divided into 9 and 12 congruent sectors. FIG. 31 comprises FIGS. 29 and 30. Using the translated superimposed feature of the two circles successively, the common fraction ⅔ can be visualized to equate 6/9 and 8/12. FIG. 32, a picture member, includes two sectors marked with horizontal and vertical hatching segments to represent addition of two fractions ½ and ⅓; FIG. 33, a superimposed picture member, is divided into 6 congruent sectors, i.e. the least common denominator between 2 and 3. FIG. 34 comprises FIGS. 32 and 33. Again, using the superimposed feature, the addition of ½+⅓ can be depicted to equate $3/6+2/6=5/6$. FIG. 35, a picture member, includes two circles, each divided into a set of sectors marked by hatching segments. The shading sectors of the circle on left represent 2/9, 1/6, and ⅓ the area of the circle in counter clockwise order; and the shading sectors on right represent 1/18, 2/9, and ⅓. FIG. 36, a superimposed picture member, includes 18 congruent sectors, i.e. the least common denominator of 18, 9, 6, and 3. FIG. 37 comprises FIGS. 35 and 36. Once again, using the translated superimposed feature on the two sets of sectors successively, the addition of 2/9+1/6+⅓ can be visually demonstrated to equate $4/18+3/18+6/18=13/18$ and $1/18+2/9+⅓=1/18+4/18+6/18=11/18$. The sectors can be shaded in transparent solid colors with a distinct color for each sector, instead of hatching lines. Thus many problem solving devices for addition of common fractions or equivalent fractions can be created by using prescribed sets of pictures and superimposed picture members.

I claim:

1. A teaching aid device for visually demonstrating mathematical problems, comprising:
    a generally rectangular base member having a first graphical representation thereon;
    a pair of channel tracks removably mounted along two parallel opposed edges of the base member, each channel track having at least two independent U-shaped channels; and
    at least one transparent overlaying member having a mathematical graph thereon slidably mounted in one of said channels of each said channel track for translation relative to the base member.

* * * * *